Feb. 16, 1937.   B. C. PLACE   2,070,839
RUNNING BOARD ASSEMBLY
Filed July 13, 1934   2 Sheets-Sheet 1
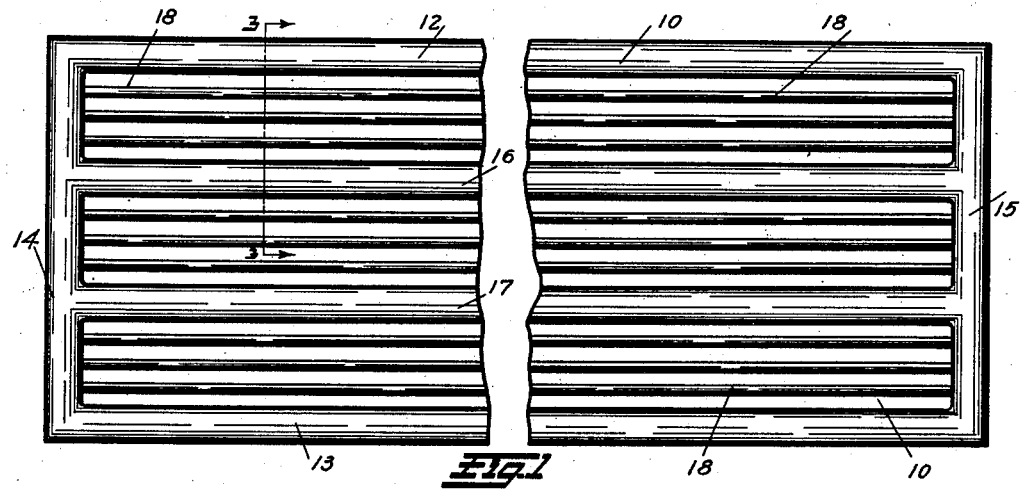
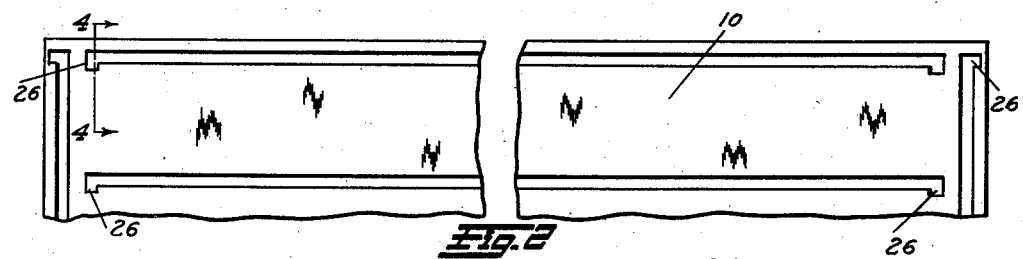
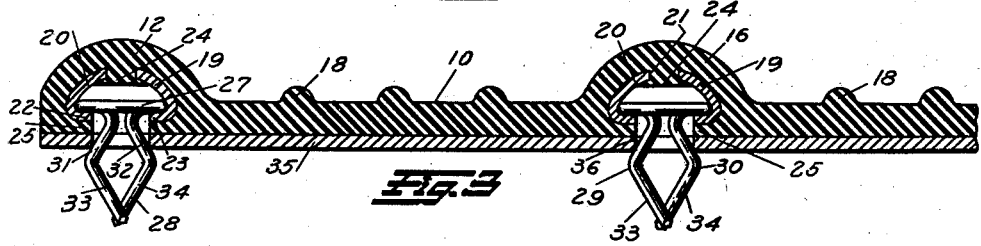
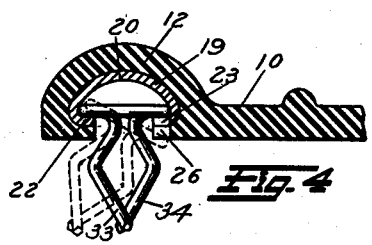
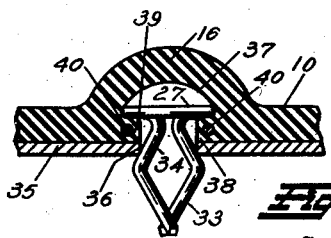
Inventor
Bion C. Place
Strauch + Hoffman
Attorneys

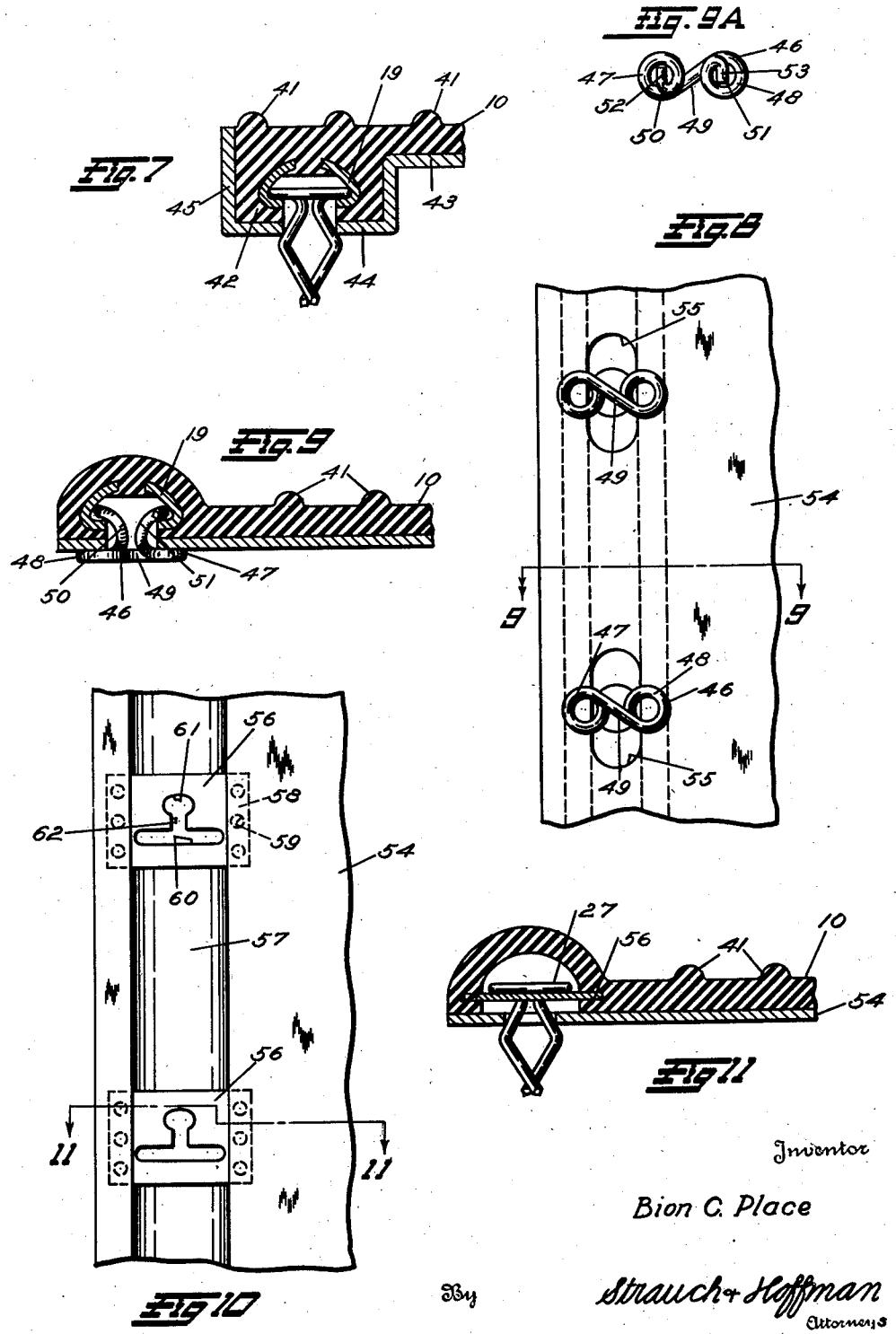

Patented Feb. 16, 1937

2,070,839

UNITED STATES PATENT OFFICE 2,070,839

RUNNING BOARD ASSEMBLY

Bion C. Place, Detroit, Mich., assignor of one-half to George E. Gagnier, Detroit, Mich.

Application July 13, 1934, Serial No. 735,045

15 Claims. (Cl. 280—169)

This invention relates to the securing of mats treads, covers or the like upon supporting surfaces by means of spring or other fasteners. More particularly, the invention relates to an improved mat, tread or cover, formed to permit ready assembly of the fasteners to secure a mat tread or cover upon a support, such as a floor or the like, the mat, tread or cover being formed so that the fasteners, subsequently assembled with respect thereto, are invisible from the normally exposed side thereof.

The primary purpose of the present invention is to provide a mat, tread, or cover constructed so that fasteners utilized to secure the mat, tread or cover may readily be assembled with respect thereto from the normally underside thereof, and so that the heads of the fasteners may be disposed between the upper and under surfaces of the mat, tread or cover, without being visible from the upper surface to the end that the mat or the like may lie flat upon the floor, running board or similar surface.

A further object of the invention is to provide a mat, tread or cover for the running board of an automobile or similar structure which mat, tread or cover is constructed from rubber or similar initially plastic material, and includes metallic fastener receiving strips embedded in the rubber or the like in such a way as to permit fasteners to be subsequently interlocked with respect to the mats, tread or cover from the under surface thereof.

Another object of the invention is to provide an improved rubber or similar cover or tread having reinforcing ribs, projecting from the normally exposed surface thereof, in which use is made of said ribs to embed therein a metallic fastener receiving strips that are completely covered with rubber so far as any part of the mat or tread is concerned that contacts with the supporting surface upon which it is secured.

Still another object of the invention lies in the production of a novel tread or cover structure having T-shaped slots, that are preferably reinforced by metal, formed in the body of the tread or cover from the underside thereof, which slots are used to adjustably receive headed spring or similar fasteners.

Still another object of the invention is to secure rubber or similar running board covers or the like upon a metallic or similar supporting surface by means of snap fasteners applied in such manner as to resiliently but firmly draw the rubber cover upon the supporting surface to the end that shifting of the cover to said surface cannot take place though the cover can be removed by simply withdrawing the spring fasteners from the openings or sockets in which the holding portions thereof are disposed.

This invention also aims to provide a cover or mat for the running board of an automobile or the like, constructed of rubber composition or a similar plastic material and including ribs projecting from the under surface of the cover and designed to accurately fit within a groove formed in the supporting structure for the cover, and to utilize such ribs to embed a fastener receiving strip therein, if desired.

Still another object of the invention is to provide an improved mode of securing mats, covers, treads or the like having T-shaped fastener receiving channels therein, by means of fasteners that have helical holding arms that may be rotated into position to firmly draw the mat, cover, tread or the like upon the supporting surface therefor.

Still another object of the invention is to provide a mat, cover or tread, constructed of rubber composition or similar material and including fastener anchoring means embedded therein in such a way as not to restrict the flexibility of the mat, cover or tread, so that the latter may be bent into contact with curved supporting surfaces in order that a mat or cover that is molded in flat form may be readily made to conform to said surface.

Further objects of the invention will appear as a description thereof proceeds with reference to the accompanying drawings in which:

Figure 1 is a plan view of a cover, mat or tread for a running board, stair or the like, a portion of said cover being broken away to reduce the size of the figure.

Figure 2 is a fragmentary view of the cover, mat or tread as seen from the underside thereof.

Figure 3 is a sectional view taken on the plane indicated by the line 3—3 of Figure 1, looking in the direction of the arrows, said view being drawn on an enlarged scale.

Figure 4 is a sectional view on an enlarged scale taken on the plane indicated by the line 4—4 of Figure 2 looking in the direction of the arrows.

Figure 5 is a fragmentary view of a piece of molding entering into the construction of the cover, mat or tread.

Figure 6 is a view similar to Figure 3, but showing a modification of the invention.

Figure 7 is a fragmentary sectional view showing a modified form of mat or cover provided with a rib projecting from the under surface and engaging in a groove formed in the supporting structure, the fastener receiving strip being embedded in said rib.

Figure 8 is a view of a running board provided with a cover, such as illustrated in Figure 3, in which an alternative form of fastener is used to secure the cover or mat to the support.

Figure 9 is a sectional view taken on the plane indicated by the line 9—9 in Figure 8, looking in the direction of the arrows.

Figure 9A is a view of the fastener included in Figures 8 and 9, the holding legs being uppermost.

Figure 10 is a fragmentary view of the underside of a rubber or similar running board cover provided with individual fastener receiving plates or devices secured thereto by embedding portions thereof in the rubber composition.

Figure 11 is a sectional view taken on the plane indicated by the line 11—11 in Figure 10, looking in the direction of the arrows.

Like reference characters indicate like parts throughout the several figures.

The cover, mat or tread of the present invention consists of a body 10, preferably formed of rubber or rubber composition in the outline of the surface to be covered thereby. When the cover, mat or tread is to be used upon the running board of an automobile, the body 10 is preferably formed to the dimensions of the surface of the running board that is to be covered. If the mat is to be used as a tread for a metallic or similar stair, the body is formed of a width and length considered appropriate for this purpose.

The top surface of the mat may assume any desirable configuration. Preferably the mat, which may be molded in any desired form, includes ribs 12 and 13 paralleling the longitudinal edges thereof and further ribs 14 and 15 extending transversely of the longitudinal ribs as illustrated. Further intermediate longitudinally extending ribs 16 and 17 may be provided. Said intermediate ribs may be omitted if desired. The ribs 12, 13, 14 and 15 are preferably formed at the extreme margins of the mat as illustrated, though they may be spaced from said margins if desired.

Between the large ribs 12 and 16, 17 and 13 a multiplicity of smaller ribs 18 may be provided. While longitudinally extending ribs have been illustrated, any other arrangement may be used for utilitarian purposes or in order to present an ornamental appearance.

An important part of the present invention consists in the use of fastener receiving strips embedded in a mat or cover such as just described. Preferably, the fastener receiving strips are embedded within the relatively large ribs 12, 13, 14, 15, 16 and/or 17. The fastener receiving and reinforcing strips 19 are preferably constructed from sheet metal and include a channel shaped body portion 20 provided with a multiplicity of spaced perforations 21, Figure 5, preferably extending through the bottom of the channel as illustrated. The edges of the channel, constituting the body of the fastener receiving strip, are turned inwardly toward each other as indicated at 22 and 23, providing shelves upon which the heads of the fasteners may rest as hereinafter described, said inturned edges being spaced apart sufficiently to permit the passage of portions of the fastener from within the hollow fastener receiving strip thus formed.

The strips 19 are embedded in the rubber or similar compositions during the formation of the mats or treads, the rubber flowing into the perforations 21 serving to provide keys 24 between the rubber composition and said strip, preventing endwise or shifting movement of the strip in the composition. Preferably, the rubber of which the body of the mat is composed extends around the inturned flanges 22 and 23 as indicated at 25, so that the fastener receiving strips are covered on all sides with rubber, the portions 25 providing layers of resilient material between the fastener receiving strips and the metallic or similar supporting structure when the mat is in position upon said structure, thereby avoiding contact between the metal fastener receiving strips and the metal or similar supporting structure.

In order that the heads of the fastener, to be used to secure the mat or tread to the supporting structure may be brought into interlocked relation with the hollow fastener receiving strips, a notch 26 may be formed in one or the other of the inturned flanges 22 and 23 of the fastener receiving strips as designated in Figures 2 and 4, said notch extending through the portion 25 of the rubber underlying the inturned flange in which it is formed. The fastener receiving strip may extend substantially the entire length and width of the mat or cover paralleling the edges as illustrated in Figure 2, intermediate fastener receiving strips being used whenever deemed necessary, though in many situations, the use of such strips paralleling the longitudinal and transverse margins of the tread or mat will suffice. The notches 26 are formed at one or both ends of the fastener receiving strips, the formation of such notches at both ends being preferred in order to minimize the extent to which the fasteners must be shifted as hereinafter pointed out in assembling them with respect to the mat.

A mat or tread constructed as just described may be secured upon a metallic or similar supporting structure by means of any headed fastener. This invention contemplates, however, the use of spring or snap fasteners of the type illustrated in patent No. 1,679,266 granted July 31, 1928. As more fully described in said patent, said fastener consists of a head 27 and a shank 28 consisting of two legs 29 and 30 that are bowed outwardly with respect to each other between the head 27 and the tip of the shank formed by overlapping the ends of the legs 29 and 30. Such fastener is preferably formed of a single piece of wire in a manner more particularly pointed out in said patent, the outwardly bowed legs forming holding surfaces 31 and 32 that diverge from the head toward the end of the shank of the fastener and converging guiding surfaces 33 and 34, which converge from the point of maximum outward bowing of the legs toward the tip of the shank of the fastener. Other headed spring fasteners may be used or headed bolts may be employed.

When it is desired to secure the mat or tread in place, the fasteners are first assembled or interlocked with respect to the mats or treads by engaging or bring the heads of the fasteners successively within the hollow fastener receiving strips. This can be readily accomplished by tilting the fasteners as indicated by the dotted lines in Figure 4, and swinging one corner of the head through the notch 26 provided at the end of such strip. When the heads are disposed within the hollow fastening receiving strip, they may be slid lengthwise of said strips and brought into proper position endwise of the fastener receiving strips. Preferably the strips are so constructed that when the heads of the fasteners are disposed therein, they will be relatively snugly received within the hollow strip, so that the fasteners will be maintained in position by frictional engagement between the edges of the fastener and the portions of the fastener receiving strips with which they contact. In this way the fasteners will remain in position during the operation of securing the mat or tread upon the supporting surface in a manner presently to be described. All of the fastener receiving strips are provided with fasteners disposed in spaced relation corresponding to the openings or sockets in the supporting structure. After all of the fasteners have been assembled in this manner, the tread or mat is ready to be applied upon said structure.

In the construction of automobiles, it is customary to secure the running board covers or mats upon a sheet metallic supporting structure, a fragment of which is indicated in Figure 3 of the drawings and disignated by 35. Said supporting structure is provided with openings 36 located adjacent the edges of the surface of said supporting structure that is to be covered by the mat or tread, and if intermediate fasteners are used, in position to receive the shank of said fasteners. In applying the mat or tread to the supporting structure it is only necessary to bring the shanks of the fasteners assembled with respect to the mat or tread in the manner above stated successively opposite the openings 36 in the supporting structure and to then exert a pressure causing the shanks of the fasteners to be snapped into said openings as fully pointed out in the patent above referred to. It will be understood that if the fasteners are not accurately in position in the fastener receiving strips they may be readily shifted or adjusted by hand to bring about exact registry between the protruding shanks of the fasteners and the perforations with which they are to be engaged.

If bolts are used instead of the spring fasteners, that are preferred, it will be understood that the bolts may be similarly applied to the mat, and the shanks passed through the openings 36 in the supporting structure 35 and the mat secured by the subsequent application of nuts to the protruding shanks of said bolts.

It will be observed that when the mat or tread is secured as just described, each of the fasteners exerts a pull upon the mat through the fastener receiving strips in view of the fact that the divergent portions of the legs 29 and 30 resiliently engage the corners of the openings 36 in the supporting structure, the fastener being so designed that these portions are bent slightly from their normal position when the fastener is in applied position. This is accomplished by forming openings 36 of a diameter slightly less than the normal width of the fastener measured across the shank at the point at which the fastener contacts with the inner corner of said openings. The mat or tread is thus firmly held upon the supporting structure and in view of the fact that the portions 25 of the rubber composition, of which the mat is composed, are disposed within the fastener receiving strips and the metal supporting structure, it will be appreciated that a metal to metal contact is avoided, thus preventing the development of squeaks due to a shifting of one metal part upon another. The fastener receiving strips it will be understood will serve to stiffen the mat or tread and cause it to lie absolutely flat between the fasteners.

In Figure 6 a modification of the invention is shown in which the use of complete hollow fastener receiving strips in the form illustrated is dispensed with. In this form of the invention the mat or tread is molded to provide a hollow fastener receiving channel 37 having inturned lips 38 and 39 providing shelves, similar to those provided by the inturned flanges 22 and 23 of the fastener strips before described, for the reception of heads of fasteners subsequently assembled in said channel. Preferably the inturned lips have embedded therein continuous reinforcing wires 40 that serve to stiffen them and prevent the fasteners from being disengaged from the mat or tread by distortion thereof. In this form of the invention, as in that previously described, notches are provided adjacent the ends of the fastener receiving channels 37 by cutting away a part of either the lip 38 or 39 at one part of the channel, enabling the fasteners to be inserted in said channel from said notch and adjusted along the length thereof to bring them in proper position.

In this form of the invention the fasteners are assembled in said channel as above described, and the mat or tread with the fasteners assembled with respect thereto is applied to the supporting structure as above pointed out.

If desired, the mat and running board supporting structure may be constructed in the form illustrated in Figure 7. In this form of the invention the body 10 of the mat may be provided with a multiplicity of ribs 41 projecting from its top surface, all of the same height. Longitudinally extending ribs have been illustrated, but it will be understood that the ribs may extend in any direction, or may be entirely omitted if desired. The fastener receiving strips 19 corresponding to those illustrated in the form of the invention disclosed in Figure 3 are embedded in a relatively large rib 42 projecting from the under surface of the mat. Any number of such ribs may be used and said ribs may extend longitudinally and/or transversely of the mat. When such ribs are provided the supporting structure or running board 43 is provided with a groove or corrugation 44 formed to relatively snugly receive the rib 42. While the rib 42 and groove 44 are illustrated as of rectangular form, it will be understood that they may assume any desired configuration. If desired, the edge of the running board may be provided with an upturning flange 45 preferably extending to the top edge of the mat or in the same plane with the top surface of the body 10 of the mat. The top surface of the mat is relatively flat, though ample thickness is provided to receive the fastener receiving strip. Moreover, the rib 42, in view of its nested disposition within the groove 44 serves to maintain the mat or cover from lateral shifting. The mat is applied to the running board support in the manner above described with reference to the form of the invention first described as illustrated in this figure, and similar fasteners may be used.

A mat or running board cover of any of the types above described may be secured to the running board support by the use of spring fasteners that may be rotated into engaging position, as illustrated in Figures 8 and 9 of the drawings, these figures including the fastener illustrated in Figure 9A. A similar fastener is described in application S. N. 665,201, filed April 8, 1933. The fastener illustrated in Figure 9A is preferably constructed from a single piece of wire by bending the mid-portion thereof to form a head 46 in a form approximating a figure 8, and including loops 47 and 48 connected by a straight portion 49. The ends of the wire are curved out of the plane of the head to form helical legs 50 and 51. The ends of said legs are preferably bent to provide straight portions 52 and 53 preventing ready disengagement of the fastener as hereinafter described.

When fasteners of the type just described are used, the supporting structure or running board 54 is provided with a multiplicity of elongated openings 55 formed to register with portions of the T-shaped fastener receiving grooves formed in the mat. In the application of the mat to the supporting structure or running board, the mat is disposed on the supporting structure, and the fasteners are then successively applied from beneath said structure. To accomplish this, the legs 50 and 51 are passed through the openings 55 and into the fastener receiving grooves, the major dimension of the head 46 of the fastener extending lengthwise of said elongated opening. A suitable tool or similar means is then brought into engagement with the loops 47 and 48 and the fastener is rotated through an angle of 90° to bring the loops 47 and 48 into engagement with the supporting structure at opposite sides of the elongated openings 55.

During the turning of the fastener to bring it into the position just stated, the helical legs 51 and 50 engage the inner corner of the fastener receiving strips 19, drawing the mat or cover firmly upon the supporting structure. When the fastener is in its applied position, the straight portions 52 and 53 engage with opposite walls of the fastener receiving strips 19 and resist further rotation of the fastener in either direction, the fastener being designed so that said straight portions bear firmly against the opposite walls of the fastener receiving strips. In view of the engagement of these portions with said walls, ready disengagement of the fasteners is prevented. It will be observed that the fastener does not protrude substantially from the under surface of the supporting structure or running board, the loops 47 and 48 and connecting portion 49 being maintained in the same plane.

Figures 10 and 11 illustrate a still further modified form of mat or running board cover designed particularly for use upon curved surfaces. In this form of the invention, the running board cover or mat is molded flat and instead of utilizing longitudinally extending fastener receiving strips individual fastener receiving plates 56 are used. Said plates extend across the channels 57 formed in the under surface of the mat or cover. Plates 56 are located at the points along the length of said channel at which the fasteners are to be applied and are embedded in the mat or cover during the manufacture thereof, preferably by embedding the edges of the plates in the mat adjacent the side of the channel 57. If desired, openings 59 may be provided in the edges 58 in order to permit the rubber composition to pass through the edges 58 and thus anchor said plates firmly in position.

If the fasteners of the kind illustrated in Figure 3 are to be used, the body of the plate 56 is provided with a specially formed slot or opening including a wide portion 60, and a substantially circular portion 61 connected by a narrow slot 62.

When it is desired to secure a running board cover of such construction in position, the fasteners are interlocked with respect to the plates by tilting the fastener and passing the head 27 through the portion 60 of the opening in the body of the plate to bring said head between the under part of the channel 57 and the plates 56. The fastener is then moved along the slot 52 and rotated within the opening 61, in a manner more particularly pointed out in my Patent No. 1,722,944, granted July 30, 1929. The mat may then be applied to the supporting structure or running board by entering the legs of the fastener in the openings provided therein as above pointed out. If fasteners of the type illustrated in Figures 8, 9 and 9A are used, it will be understood that a circular opening in the body of plate 56 may be employed.

When the mat or cover is constructed as just described, so as to include individual fastener receiving plates located at the points thereof at which fasteners are to be applied, the cover or mat retains a high degree of flexibility. That is, the inherent flexibility of the rubber of which the mat or cover is made being retained inasmuch as no continuous metal fastener receiving strips are embedded therein. As a result, the mat or cover may be readily bent to follow the contour of any curved surfaces to which it may be desired to apply the same.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A cover for the running board of a vehicle or the like, consisting of a body of vulcanized rubber composition and metallic fastening receiving and reinforcing strips embedded in said body, said strips being exposed from the normal underside of the cover for interlocking fasteners therewith and being completely covered by said body except to permit the passage of fasteners.

2. A mat or the like having a body of molded initially plastic material and a plurality of metallic molding strips each in the form of a channel having edges turned toward each other but disposed in spaced relation embedded in said material, said material covering said strips externally to said edges providing space for the passage of parts of fasteners to secure said cover upon a support.

3. A mat or the like comprising a body of initially plastic material and a plurality of hollow metallic moulding strips embedded therein, and grooves formed in said body and said strips whereby fasteners can be assembled in and adjusted along said strips with parts thereof passing through said grooves.

4. A mat or the like comprising a body of initially plastic material having a plurality of ribs projecting from the normally exposed surface, hollow fastener receiving molding strips embedded in the ribs of said body and grooves formed in said body and strips providing substantially T-shaped fastener receiving and adjusting channels in said mat.

5. A mat or the like comprising a body of a rubber composition having a plurality of ribs projecting from the normally exposed surface, hollow fastener receiving molding strips embedded and vulcanized within the ribs of said body, and grooves formed in said body and strips providing substantially T-shaped fastener receiving and adjusting channels in said mat.

6. A mat or the like comprising a body of rubber composition and metallic fastener receiving strips, each strip being of channel-like formation and having portions of the strip turned toward each other from the edges of the channel, said strips being embedded and vulcanized in said body and perforations in said channel-like portion of said strips receiving said composition to retain said strips in said body.

7. In combination, a supporting surface provided with openings, a unitary mat having an imperforate top surface disposed on said supporting surface, and spring stud fasteners each having a head and a resilient shank including only two legs presenting divergent holding surfaces from the head retaining said mat removably upon said surface, the heads of the fasteners being removably disposed between the top and under surfaces of said mat and said shanks being entered in said openings and drawing said mat yieldingly toward said supporting surface.

8. In combination, a supporting surface provided with openings, a unitary mat of rubber composition having an imperforate top surface and a plurality of hollow ribs formed as an integral part thereof disposed on said supporting surface, and spring stud fasteners having portions thereof disposed in and adjustable along said hollow ribs and holding portions snapped in said openings.

9. In combination, a supporting surface provided with openings, a unitary mat of rubber composition having an imperforate top surface and a plurality of sheet metallic hollow moldings embedded and concealed therein, and spring stud fasteners having portions thereof disposed in said moldings and holding portions snapped in said openings.

10. The combination defined in claim 9 in which said moldings are disposed in ribs of said mat.

11. A mat or the like comprising a body of rubber composition having fastener receiving grooves formed in the body from the under side of the mat, and fastener receiving elements anchored in said composition at the points where the fasteners are to be applied, said mat being freely flexible between said elements.

12. In combination, a running board or like supporting structure provided with a groove, a mat disposed on said structure having a rib fitting in said groove, and headed fasteners having their heads disposed in said rib securing said mat to said structure.

13. In combination, a running board or like supporting structure provided with a groove, a mat disposed on said structure having a rib fitting in said groove, a fastener receiving strip embedded in said rib, and fasteners each having a part thereof in engagement with said strip securing said mat to said structure.

14. A mat or the like comprising a body of rubber composition having fastener receiving grooves formed in the body from the under side of the mat, said grooves being partially closed by lips formed on said mat adjacent the under side thereof, and reinforcing strips embedded in back of said lips.

15. A mat or the like comprising a body of rubber composition having fastener receiving grooves formed in the body from the under side of the mat, said grooves being partially closed by lips formed on said mat adjacent the under side thereof, and notches formed in said lips at spaced intervals along the length of said grooves for increasing the width of said grooves adjacent the under side of said mat.

BION C. PLACE.